Nov. 17, 1964 W. F. SCHEEL 3,157,444
SLOTTED BEARING SLEEVE WITH LUBRICANT RETAINING MEANS
Filed Oct. 12, 1962

INVENTOR.
Walther F. Scheel
BY
Strauch, Nolan & Neale
Attorneys

United States Patent Office 3,157,444
Patented Nov. 17, 1964

3,157,444
SLOTTED BEARING SLEEVE WITH LUBRICANT RETAINING MEANS
Walther F. Scheel, Detroit, Mich., assignor to Rockwell-Standard Corporation, Coraopolis, Pa., a corporation of Pennsylvania
Filed Oct. 12, 1962, Ser. No. 230,161
9 Claims. (Cl. 308—238)

The present invention refers to bearing sleeves for shafts, rods, spindles, and the like, and more particularly to a longitudinally split sleeve of special structure made of some suitable non-metallic plastic such as polyamide, polyethylene, tetrafluoroethane and equivalently hard tough slippery compositions.

It has become widespread practice to employ in bearings or bushings involving relatively slowly rotating or rocking shafts under conditions where there is little or no appreciable or unduly high radial and/or thrust loads to incorporate thin, sleeve type bearing elements made of any of the commercially available hard polymer plastics known as nylon, delrin, Teflon and the like because of their good thermal characteristics, low coefficient of friction and economy and since they can be molded or cut from strips and rolled to shape without subsequent machining operations. Most of those prior known plastic bearing sleeves are provided with a longitudinal slit from end to end which leaves a space between the adjoining ends permitting the sleeve free circumferential displacement to expand and contract under operating condition and prevent cold flow of the plastic material and subsequent seizure in the bore or on the shaft. Such an expedient is shown in Thomson Patent 2,851,316 issued September 9, 1958, wherein the sleeve bearing consists of a metal shell lined with a longitudinally split plastic bearing sleeve. The present invention comprises an improvement over this type of structure chiefly in that a special slot structure is provided for improved lubricant retention and the metal shell is not necessary.

It is therefore a major object of the present invention to provide an improved lubricated thin-walled bearing sleeve providing novel means to trap and retain lubricant for equal distribution along the bearing surfaces.

A further object of the present invention is to provide a novel thin-walled split bearing sleeve for slow rotating or rocking shafts, pins or spindles made of non-metallic plastic and having a longitudinal slit comprising intermediate intersecting slot sections connected at their axially outer ends to ends of parallel circumferentially extending slots of extremely narrow width which in turn are connected at their other ends to oppositely inclined slots opening to the opposite outer edges of the sleeve, the intermediate slots being adapted to provide a lubricant retaining pocket.

Another object is to provide in a plastic sleeve bearing one or more shallow internal circumferential grooves which intersect intermediate intersecting inclined slots and which are provided at substantially equally spaced intervals with lubricant admission openings.

Still another object of the invention is the provision of a plastic bearing sleeve longitudinally split from end to end in irregular fashion, the split being provided with circumferentially extending interlocking surfaces which resist distortion of the split sleeve and further prevent the escape of lubricant from an intermediate slot portion of the split.

A still further object of the invention resides in the provision of a non-metallic bushing made of a tough hard slippery plastic having an interlocking longitudinally continuous slot that has an intermediate portion composed of intersecting slot circumferentially separable sections, with the ends of those sections extending into sections that are relatively circumferentially slidable but not circumferentially separable as the sleeve expands in operation.

Further objects of the invention will presently appear as the description proceeds in connection with the appended claims and the annexed drawings wherein:

Figure 1:
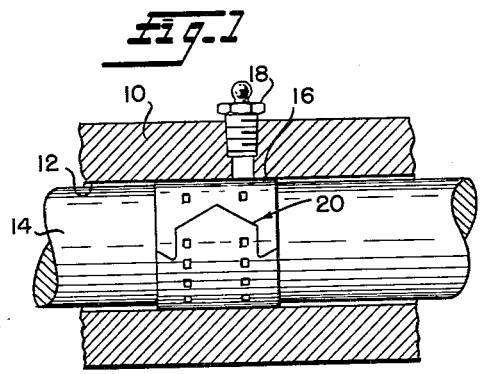
FIGURE 1 is fragmentary elevation partly in section showing a shaft and bearing assembly according to a preferred embodiment of the present invention.

In FIGURE 1 a housing 10 is provided with a cylindrical bore 12 through which extends a shaft 14 supported for relative rotation or rocking in a bearing sleeve 16 fitted within bore 12. Bearing sleeve 16 may be snapped in within bore 12 so as to be non-rotatable or if desired it may be permitted to rotate with the shaft 14 or independently mounted for free relative rotation. The bearing sleeve 16 of the present invention is primarily adaptable to slowly rotating or rocking shaft, rod or pin assemblies, particularly shaft assemblies in which the shaft rotation is unidirectional or bi-directional but not rotating through a full 360 degrees, such as rocking shafts. Such assemblies are for example found in automobile front axle steering knuckle pins, suspension linkages, brake cam shafts, rocker arms, etc. Any one of these which may be represented by the illustration in FIGURE 1.

A suitable grease fitting 18 may be provided in the housing 10 for pressure lubrication of the bearing sleeve 16 to allow periodical injection of lubricating grease into the housing and into the interior of the sleeve. It will be noted that the outer surface of the bearing sleeve 16 directly engages the inner surface of housing 10 and the inner diameter of the bearing sleeve 16 is in direct bearing contact with the outer surface of the shaft 14, without any intermediate auxiliary housing member for the bearing sleeve to retain the bearing or to provide a wear resistance surface as is the case in many prior art bearing sleeves of this general type.

Figure 2:
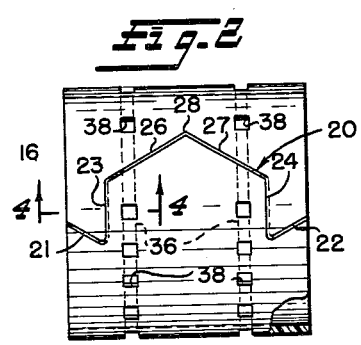
FIGURE 2 is an enlarged side view of the sleeve type bearing element of FIGURE 1 showing the special longitudinal slot structure.
Figure 3:
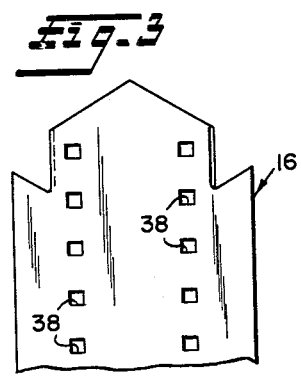
FIGURE 3 is an enlarged developed end section of the bearing sleeve showing the slot construction in detail.

Referring to FIGURES 2 and 3 for detail, the bearing sleeve 16 of the present invention consists essentially of a split annular integral body made from tough, flexible but wear and heat resistant plastic material that is suitable. Sleeve 16 is thin-walled and extremely smooth on both inner and outer surfaces and of uniform wall thickness throughout, except where grooved or slotted. This split sleeve may for example be made from flat strips of the material cut into desired lengths and rolled into substantially cylindrical shape by heat forming. However, a more preferred method is an injection molding process in which the molten plastic is injected into a mold in which is inserted a shaped plug around which the sleeve forms and which after the plastic has cooled and congealed is withdrawn from the mold with the finished bearing sleeve.

Sleeve 16 is split axially from end to end to form a special slot 20 of irregular shape. The diagonal portions of the slot 20 are in the free condition of the sleeve of a width sufficient to compensate for expansion and contraction under application conditions, this width being preferably between .010 and .050 of an inch in all slot sections axially along the sleeve.

Figure 4:
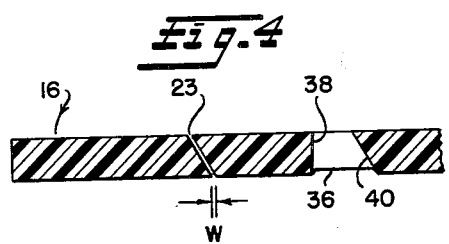
FIGURE 4 is an enlarged section through one of the lubricating holes and associated internal groove and one of the circumferential locking slots substantially on line 4—4 of FIGURE 2.
Figure 6:
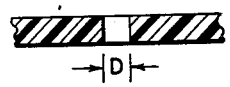
FIGURE 6 is a fragmentary detail in section substantially along line 6—6 in FIGURE 5.
Figure 6:
Figure 5:
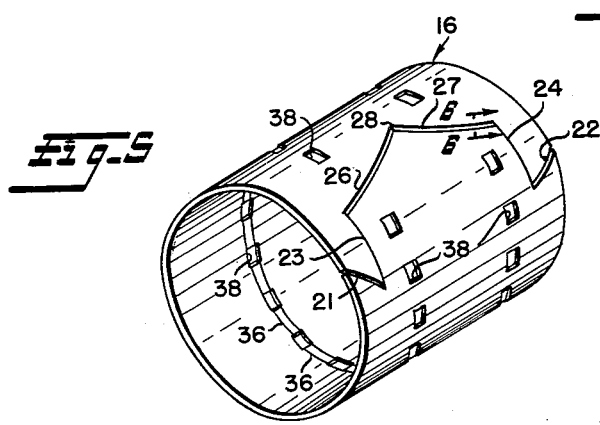
FIGURE 5 is a perspective view of the bearing sleeve of FIGURE 2 apart from the shaft.

The slot 20 starts at opposite side edges of the sleeve with straight short diagonal sections 21 and 22 which converge toward the interior of the sleeve at the same angle, about 45°, and are of equal length. At their inner ends inclined slot sections 21 and 22 connect in an acute angle to corresponding ends of short straight sections 23 and 24 of equal length which are parallel to each other and the side edges of the sleeve and extend substantially circumferentially of the sleeve. In slot sections 23 and 24, there is only a sliding clearance between the abutting surfaces as compared to the wider gap provided at said inclined sections, the distance W (FIGURE 4) between the adjoining surfaces of the circumferential sections being preferably between .002 and .006 of an inch. Slot sections 23 and 24 as shown in FIGURE 4, are composed of flat surfaces that extend angularly to the inner and outer surface planes of the sleeve, said slot sections 23 and 24 being therefore disposed angularly relative to the sleeve bearing surfaces.

Circumferential slot sections 23 and 24 are sufficiently long to allow adequate free radial expansion and contraction movement as required by the gap of the foregoing inclined slot sections and still maintain a certain length of engagement of their abutting surfaces sufficient to prevent a complete disengagement thereof.

The other ends of the circumferential slot sections 23 and 24 are connected to oppositely inclined converging slot portions 26 and 27 extending oppositely to inclined slot sections 21 and 22 respectively. Diagonal slot portions 26 and 27 are of the same length and intersect in the axial middle of the sleeve at 28 to form an arrow-like portion of the slot midway between the ends. The gap at slot portions 26 and 27 is the same as at the inclined sections 21 and 22, about .010 to .050 inch.

From the foregoing it will be apparent that the axially irregular slot of the sleeve 16 permits radial expansion or contraction of the sleeve but prevents any relative axial movement of the cylindrical sections at the slot because of the axially abutting slidably engaged circumferential surface portions at 23 and 24 which permit substantially only sliding circumferential displacement between the adjoining surfaces. This provides an interlock which keeps the cylindrical end surfaces of the sleeve in good alignment. The circumferential slot sections 23 and 24, as shown in FIGURE 4, have opposed sliding surfaces preferably inclined at a suitable angle, about 45°, to the plane of the sleeve wall and serve still another purpose which will be hereinafter explained.

In an actual installation such as in FIGURE 1, the plastic sleeve bearing 16 is provided with lubricant after assembly into housing 10 by introducing grease through fitting 18. This grease collects in the pocket formed by the intermediate arrow shaped slot portion at 26, 27, and 28 and is effectively retained therein because slot portions 26 and 27 here are essentially blocked by the closely fitting straight circumferential slot sections 23 and 24.

For effective grease distribution circumferentially along the surfaces of the sleeve, it is preferred to provide one or more parallel shallow circumferentially continuous grooves 36 extending entirely around the internal surface thereof intermediate the ends of the bushing and intersecting either one or both of the intermediate inclined slot portions 26 and 27. Each groove is formed with a series of equally spaced apertures 38 through its bottom wall as shown in detail in FIGURE 4 which may have inclined sides one of which 40 may provide an increased draft angle to facilitate the removal of the bushing from the plug after injection molding. Apertures 38 distribute grease from fitting 18 into the internal grooves 36 to lubricate the surface of shaft 14. Preferably the inner end of fitting 18 aligns with at least one aperture 38.

The invention thus provides effective lubrication from the locked-in arrow shaped reservoir at 26, 27 and it will be appreciated that this reservoir is maintained no matter what amount the sleeve circumferentially contracts or expands, due to the adequate length of the slot portions 23 and 24. Furthermore, due to the irregular directions of the several inclined slot portions, pressure lubrication does not so force the interlock apart so that grease will leak out of the sleeve along the slot as has been the case in prior art lubricated plastic bushings, but will instead be retained in the reservoir.

The present invention may be embodied in other forms without departing from the essential characteristic or spirit thereof, therefore, the present embodiment is to be considered in all respects as illustrative only and not restrictive the scope of the invention being indicated by the appended claims rather than by the foregoing description.

I claim:

1. A thin walled split bearing sleeve of tough wear resistant non-metallic plastic having smooth slippery outer and inner bearing surfaces and having a non-linear slot extending axially between and opening to the opposite side edges of the sleeve, said slot comprising an intermediate reservoir section in which the slot edges may move circumferentially toward or from each other during contraction or expansion of the split sleeve, substantially circumferentially extending slot sections having ends connected to opposite ends of said reservoir section and in which the adjacent slot edges are fitted for relative sliding circumferentially of the sleeve but so closely as to effectively block against displacement of grease out of the reesrvoir section ends, and inclined slot portions connecting with the other ends of said circumferential sections in an acute angle and which extend outwardly to the side edges of the sleeve.

2. A thin walled split bearing sleeve of tough wear resistant non-metallic plastic having smooth outer and inner bearing surfaces and having a non-linear slot extending axially between and opening to the opposite side edges of the sleeve, said slot comprising an intermediate reservoir consisting of two similarly inclined slot sections intersecting within the sleeve in which the slot edges may move circumferentially toward or from each other during contraction or expansion of the split sleeve, substantially circumferentially extending slot sections having ends connected to opposite ends of said reservoir and in which the adjacent slot edges are fitted for relative sliding circumferentially of the sleeve but so closely as to effectively block against displacement of grease out of the reservoir ends, and inclined outer slot portions connecting with the other ends of said circumferential sections in an acute angle and which extend outwardly to the side edges of the sleeve.

3. A bearing sleeve as defined in claim 2, each said outer slot sections being inclined oppositely with respect to the reservoir section connected to the same circumferential section.

4. A thin walled split bearing sleeve of tough wear resistant non-metallic plastic having smooth outer and inner bearing surfaces and having a non-linear slot extending axially between and opening to the opposite side edges of the sleeve, said slot comprising an intermediate reservoir having two oppositely equivalently inclined slot sections of equal length which intersect at about the axial middle of the sleeve, two substantially circumferentially extending parallel slot sections of equal length similarly connected to the opposite ends of said reservoir and in which the adjacent slot edges are fitted for relative sliding circumferentially of the sleeve but so closely as to effectively block against displacement of grease out of the reservoir ends, and two outer slot sections extending between the other ends of said circumferential sections and the side edges of the sleeve.

5. A thin walled split bearing sleeve of tough wear resistant non-metallic plastic having smooth outer and inner bearing surfaces and having a non-linear slot extending axially between and opening to the opposite side edges of the sleeve, said slot comprising an intermediate reservoir in the form of a chevron slot section, outer oppositely inclined slot sections intersecting the opposite side edges of said sleeve, substantially circumferentially extending straight slot sections connecting opposite ends of said chevron reservoir section to the inner ends of said outer slot sections, each said circumferential slot section intersecting an outer inclined slot section in an acute angle, the opposed edge surfaces of said circumferential slot sections having relative sliding movement circumferentially of the sleeve but being so closely fitted as to effectively block against displacement of grease out of the reservoir section ends, and at least one continuous circumferential internal groove in said sleeve intersecting said reservoir section and having a plurality of through apertures in its bottom wall.

6. A sleeve as defined in claim 5, said chevron section and said outer inclined slot sections being of a width of about between .010 and .050 of an inch.

7. A sleeve as defined in claim 6, said circumferential slot sections being inclined relative to the wall of said sleeve.

8. A sleeve as defined in claim 7, said circumferential slot sections being of a width of not less than .003 and not more than .006 of an inch.

9. A sleeve as defined in claim 5 there being two side by side apertured internal circumferential grooves each intersecting an opposite inclined side of the chevron section reservoir.

References Cited in the file of this patent
UNITED STATES PATENTS
2,851,316    Thomson _____ Sept. 9, 1958

OTHER REFERENCES

Thomson Nylined Bearings, by Thomson Industries Inc., Manhasset, New York, pages 1–8 relied upon.